(12) United States Patent
Weismann et al.

(10) Patent No.: US 6,367,342 B1
(45) Date of Patent: Apr. 9, 2002

(54) INDEXING DRIVE AND TRANSMISSION

(76) Inventors: Christopher A. Weismann, 2371 Oragne Ave., Unit B., Costa Mesa, CA (US) 92627; Patrick L. Weismann, 73 Shearwater Pl., Newport Beach, CA (US) 92660

( * ) Notice: Subject to any disclaimer, the term of this patent is extended or adjusted under 35 U.S.C. 154(b) by 0 days.

(21) Appl. No.: 09/502,858

(22) Filed: Feb. 11, 2000

(51) Int. Cl.⁷ .............................................. F16H 59/04
(52) U.S. Cl. .............................. 74/335; 74/128; 74/823
(58) Field of Search ........................ 74/823, 128, 333, 74/335

(56) References Cited

U.S. PATENT DOCUMENTS

| | | | |
|---|---|---|---|
| 3,283,611 A | 11/1966 | Weismann et al. | 74/650 |
| 3,661,059 A | * 5/1972 | Hunter et al. | 91/499 |
| 3,844,178 A | * 10/1974 | Gachot et al. | 74/128 |
| 4,817,451 A | 4/1989 | Weismann | 74/333 |
| 4,987,790 A | 1/1991 | Weismann | 74/333 |
| 5,131,285 A | 7/1992 | Weismann et al. | 74/333 |
| 6,019,010 A | * 2/2000 | Trinder | 74/335 |

* cited by examiner

*Primary Examiner*—Sherry Estremsky
(74) *Attorney, Agent, or Firm*—Lyon & Lyon LLP

(57) ABSTRACT

Indexing drives associated with a transmission each include a housing having a plurality of guideways, actuators slidably mounted in the guideways and a carrier with follower elements. The actuators include drive elements which can extend to the follower elements. The follower elements are movable across the drive elements and the drive elements are movable toward and away from the follower elements. The drive elements include convexities and the follower elements include concavities. The concavities are spaced from one another and the convexities are spaced from one another such that when one of the concavities is fully engaged with one of the convexities, two other of the concavities and two other of the convexities are sufficiently aligned to be partially engageable. The follower elements are severally arranged to provide cylindrical surfaces with concavities, circular surfaces with concavities and longitudinal surfaces with concavities. The transmission includes gears, clutches engageable with the transmission gears, clutch control elements extending to operatively engage the clutches and linkage engaged with the carrier of the indexing drive and the clutch control elements.

61 Claims, 13 Drawing Sheets

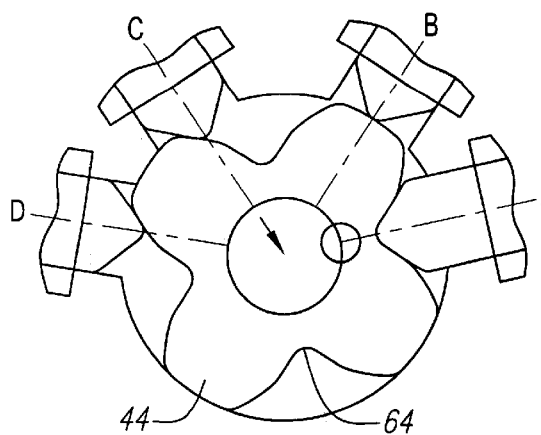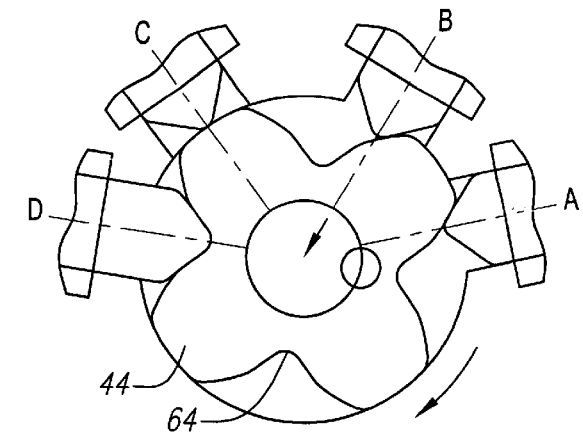
FIG. 3A  FIG. 3B
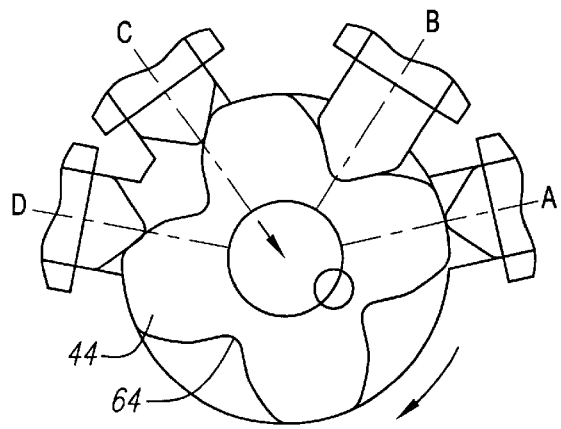
FIG. 3C
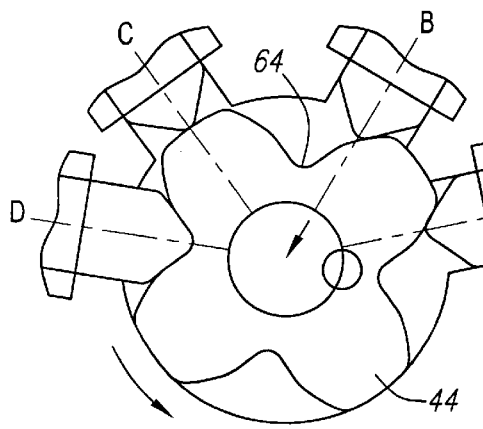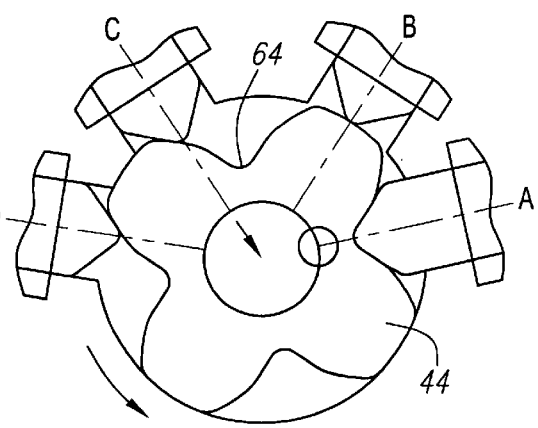
FIG. 3D  FIG. 3E

INDEXING DRIVE AND TRANSMISSION

BACKGROUND OF THE INVENTION

The field of the present invention is mechanisms for indexing mechanical devices such as transmissions.

A wide variety of devices have long been available for mechanical engagement of rotating components. Where such engagement is to occur with the elements rotating, a variety of coupling mechanisms are frequently employed. In vehicle transmissions, clutches, fluid couplings, friction bands and synchronizing rings are typical. In many circumstances, these devices are quite adequate. However, many such devices are subject to power loss, rapid wear, lack of sufficient engaging strength and lack of sufficient engaging speed.

Mechanisms for automatically locking rotating components have been employed which provide rapid engagement, very substantial engaging strength, and extended wear. One such device is a roller clutch which employs an engagement inner having an inner race, an engagement outer having an outer race and rollers therebetween. One of the two races has cam surfaces which are inclined relative to the other race. The rollers are set within a cage which generally rotates with the cam surfaces. A slight rotation of the cage relative to the cam surfaces results in selected engagement or disengagement of the inner and outer elements through wedging or releasing of the rollers. Such a roller clutch is disclosed in U.S. Pat. No. 3,283,611 to Weismann et al., entitled Positive Drive Differential. The disclosure of the Weismann et al. patent is incorporated herein by reference.

In the Weismann et al. patent, automatic disengagement of the mechanisms occurs when differential speeds are experienced by the mechanism. However, employment of such a roller cam engagement mechanism with selective engagement and disengagement in transmission applications has alluded practical utility. Proper control of the cage such that it will remain properly oriented relative to the cam surfaces and yet remain selectively controllable for engagement and disengagement has proven difficult. In transmission applications, the control of multiple engagement mechanisms becomes critical as simultaneous engagements can be catastrophic and yet very rapid shifting is desired.

Transmissions employing roller clutches such as disclosed in the Weismann et al. patent referenced above are known to employ indexing drive mechanisms in association with linkage engageable between the indexing drive and clutch control elements. Such devices are disclosed in U.S. Pat. No. 4,817,451 to Weismann, U.S. Pat. No. 4,987,790 to Weismann and U.S. Pat. No. 5,131,285 to Weismann et al., the disclosures of which are incorporated herein by reference. In the Weismann et al. '285 patent, a motor operating as a servomotor drives a pinion and rack gear, the motor acting as an indexing drive. An actuator with slots therein is longitudinally fixed to the rack and is free to rotate relative to the rack. The actuator in turn controls the position of pins which control gear engaging clutches. With the exception of the indexing drive of this disclosed transmission, the details as disclosed in the Weismann et al. '285 patent are contemplated as one possible combination with the indexing drives of the present disclosure.

SUMMARY OF THE INVENTION

The present invention is directed to an indexing drive and its combination with multiple ratio power transmission systems. The indexing drive includes actuators slidably mounted in guideways extendible to a carrier including follower elements. Concavities and convexities on the actuators and the carrier cooperate to perform an indexing function.

In a first separate aspect of the present invention, the indexing drive is configured with the housing and the actuators such that the concavities are spaced one from another and the convexities are spaced one from another so that when one of the concavities is fully engaged with one of the convexities, another of the concavities and another of the convexities are sufficiently aligned to be partially engageable. This allows the indexing drive to be set up such that the actuators can drive the carrier in at least one direction.

In a second separate aspect of the present invention, the indexing drive of the first aspect may further include that two sets of convexities and concavities are partially engageable with another set being fully engaged. This allows a selective driving of the carrier in two directions.

In a third separate aspect of the present invention, the indexing drive includes actuators slidably mounted in guideways which include drive elements extendible to follower elements on a carrier. The drive elements of the actuator are mutually parallel while the carrier includes a surface which is circular in plan and includes concavities of the follower elements therein. This configuration provides for a compact design and one which provides uniform moment arms through which the drive elements drive the carrier.

In a fourth separate aspect of the present invention, the indexing drive includes actuators slidably mounted in guideways which include drive elements extendible to follower elements on a carrier. The follower elements of the carrier define a cylindrical surface with concavities therein. The carrier is rotatably mounted. The guideways which receive the actuators include longitudinal centerlines which intersect the rotational axis of the carrier. Rotational indexing is thus provided.

In a fifth separate aspect of the present invention, the indexing drive includes actuators slidably mounted in guideways which include drive elements extendible to follower elements on a carrier. The carrier is linearly movable to index linearly rather than rotationally. Guideways carrying the actuators include longitudinal centerlines which again intersect the carrier. Rack and pinion gearing is not necessary with such longitudinal indexing.

In a sixth separate aspect of the present invention, the indexing drive includes actuators slidably mounted in guideways which include drive elements extendible to follower elements on a carrier. The actuators of the foregoing aspects may be driven by a number of devices. Among others, pressurized fluid is contemplated as well as electromagnetic coils. In the case of pressurized fluid, solenoid valves may be employed to selectively activate the actuators. Pneumatics may be used. A controller can be employed for actuating either the magnetic coils or the solenoid valves. Semiautomatic as well as automatic selection is thereby possible through such a controller.

In a seventh separate aspect of the present invention, the indexing drive of any of the foregoing aspects is contemplated to be employed in association with a transmission. Transmission gears are engaged through clutches which are driven by clutch control elements. Linkage engages the clutch control elements with the indexing drive. With the present indexing systems, rapid, accurate and exclusive engagement and disengagement of gear wheels with a shaft are possible.

In an eighth separate aspect of the present invention, combinations of the foregoing separate aspects are contemplated.

Accordingly, it is an object of the present invention to provide improved indexing and power transmission mechanisms. Other and further objects and advantages will appear hereinafter.

BRIEF DESCRIPTION OF THE DRAWINGS

FIG. 3 is a progressive series of functional views illustrating the sequential operation of the actuators with the carrier of the indexer of FIG. 1 from a plan view.

DETAILED DESCRIPTION OF THE PREFERRED EMBODIMENTS

Figure 1:
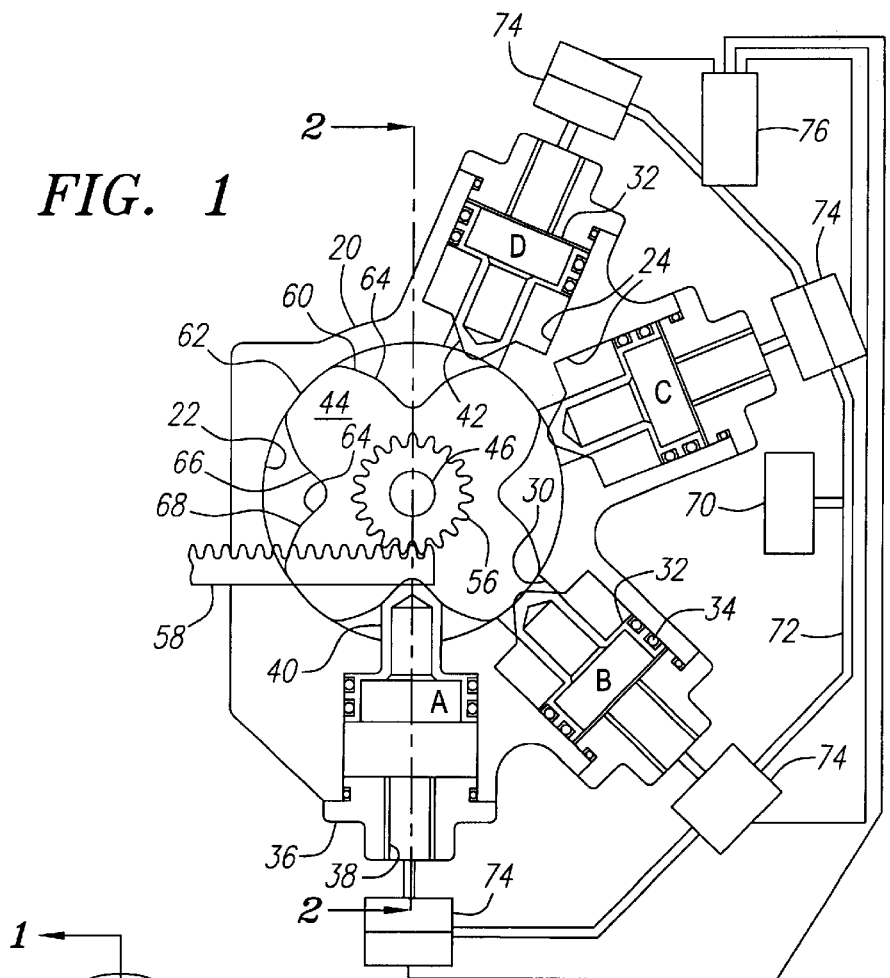
FIG. 1 is a layout plan of a first indexer taken along line 1—1 of FIG. 2.
Figure 2:
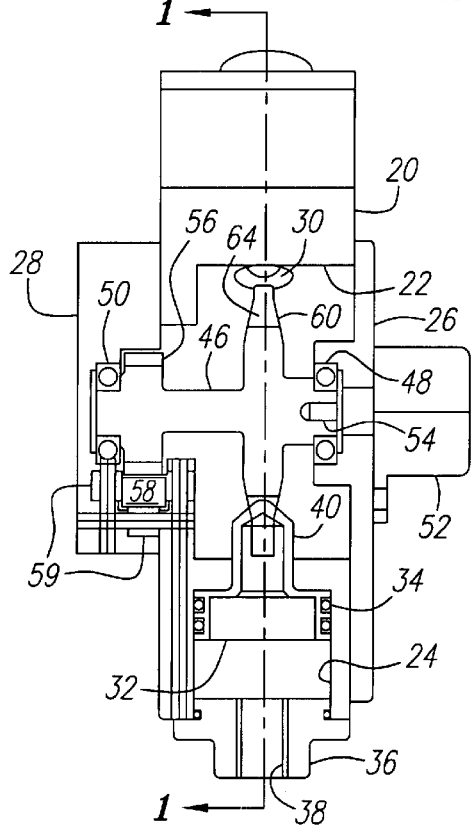
FIG. 2 is a cross-sectional side view of the indexer of FIG. 1 taken along line 2—2 of FIG. 1.

Turning in detail to the drawings, FIGS. 1, 2 and 3 illustrate a first indexing drive. The drive includes a housing 20 defining a central cavity 22 and guideways 24. A first cover 26 is rigidly held by bolts to one side of the central cavity 22 while a second cover 28 extends across the other side of the central cavity 22 and is also held in place by bolts. The guideways 24 are preferably cylindrical in shape and extend toward the center of the central cavity 22. Passageways 30 extend from the guideways 24 through the wall of the housing 20 to the central cavity 22. These passageways 30 as well as the guideways 24 have axial centerlines which extend to a point centered in the central cavity 22.

The guideways 24 each include an actuator 32 slidably mounted therein. In this embodiment, the actuators 32 define pistons closely fitting within the cylindrical cavities of the guideways 24 and sealed with piston rings 34 which may be O-rings set within circumferential grooves within the pistons.

Piston caps 36 are fixed to the housing 20 at one end of each of the guideways 24. These piston caps 36 close off the outer end of the guideways 24 and are rigidly fixed in place by bolts. Each piston cap 36 has a hole 38 axially therethrough. Each hole may be threaded or otherwise configured to receive a selectively activated source of pressurized fluid. The piston caps 36 also define stops to limit the displacement of the actuators 32 outwardly away from the central cavity 22.

The actuators 32 also include drive elements 40 which are cylindrical and fit within the passageways 30. As the actuators 32 move toward the central cavity 22, the drive elements 40 extend inwardly into the central cavity 22. The drive elements 40 each include a convexity 42 at its distal end. In this embodiment, the convexities 42 are conical shaped ends with a radius apex.

A carrier 44 is rotatably mounted centrally within the central cavity 22. The carrier 44 includes a central shaft 46 fixed within a bearing 48 set into the first cover 26 and a bearing 50 set within the second cover 28. A rotary potentiometer 52 is mounted to the first cover 26 and includes a shaft 54 extending therethrough to engage the central shaft 46 of the carrier 44. A pinion gear 56 is also fixed to the shaft 46 to provide indexing output from the carrier 44 by engaging a rack 58. The rack 58 is constrained to move longitudinally by retaining rollers 59 located to either side and beneath the rack 58.

Follower elements 60 also extend outwardly from the shaft 46 as part of the carrier 44. Through the rotational mounting of the carrier 44, the follower elements 60 are movable across the drive elements 40 while the drive elements 40 are movable toward and away from the follower elements 60.

The four follower elements 60 cooperate to define a cylindrical surface 62 with spaced concavities 64 therein. The concavities 64 are equiangularly spaced about the carrier 44 and have sloped sides 66 and 68 which extend to a V-bottom which is radiused to match the distal end of the concavities 42. These sloped sides 66 and 68 are at substantially 45° to the movement of a drive element 40 as it moves in contact with the sloped side.

As noted above, the concavities 64 are equiangularly spaced. Each of the concavities 64 has converging surfaces which include a changing radial component.

Thus, the forced extension of one of the drive elements 40, when at least partially aligned with a concavity 64, will cause the carrier 44 to rotate until the drive element 40 is fully engaged with the concavity 64. Full engagement is seen in the lowermost actuator 32 as illustrated in FIG. 1, further identified as A.

The actuators 32 are arranged in two pairs. The actuators 32 further identified as A and B are spaced apart such that actuator B will be at the midpoint of the cylindrical surface 62 between two concavities 64 when actuator A is fully engaged with the adjacent concavity 64. Actuators C and D are located in a different quadrant and are angularly spaced by the same amount as actuators A and B. With actuator A fully engaged, actuators C and D are sufficiently aligned with two other concavities 64 so as to be partially engageable. With this arrangement, the forced extension of actuator C would result in the carrier 44 moving counterclockwise as seen in FIG. 1. With the forced extension of actuator D, the carrier 44 would move in the clockwise direction as viewed in FIG. 1. Naturally, the force extending actuator A would have been released before another of the actuators 32 would be driven toward the carrier 44.

As the gear comprised of the pinion 56 and the rack 58 is shown to be at the end of the rack 58, the position shown in FIG. 1 would appropriately be the first indexing position of the device. With actuator C fully engaged, a second position of the indexer would be accomplished. At this point, actuator D is facing the cylindrical surface 62 of the carrier 44 as did actuator B in the first position. Further, with actuator C fully engaged, actuators A and B are sufficiently aligned with two of the concavities 64 so that they are partially engageable with the carrier 44. In this position, actuators A and B are on two opposite sides of the same concavity 64. Either one may be actuated to fully engage with that concavity resulting in either a progressive or regressive indexing step. The indexing drive may be designed for any number of indexing positions as the carrier 44 need not be limited to one revolution.

FIG. 1 schematically illustrates a selectively activated source of pressurized fluid. This source is illustrated to include a source of pneumatic pressure 70 and passages 72 from the source of pneumatic pressure 70 to the piston caps 36 for communication with the guideways 24. Solenoid valves 74 control pressure from the source of pneumatic pressure 70 to the guideways 24. These valves 74 are in turn controlled by a controller 76. The controller 76 may be any one of a number of control systems. Most conveniently, the controller 76 is preferably electronic and may include any one of a number of electronic or electrical control devices. By providing constant pneumatic pressure from the source of pneumatic pressure 70 and controlling the solenoid valve 74, stable and accurate indexing steps can be achieved. Alternatively, the housing 20 may include electromagnetic coils wrapped about the guideways 24 so as to magnetically drive the actuators 32. In this way, the system is entirely electric and does not require pneumatics.

Assuming the indexing drive is controlling a transmission, FIG. 3 illustrates a shift from one gear to another and back. Actuator A retains the carrier 44 in a first gear position in FIG. 3A. In FIG. 3B, actuator D is driven into the partially engaged concavity 64 to become fully engaged therewith. In this example, the position of the carrier 44 is understood to be a neutral position between gears in FIG. 3B. Actuator B is then driven into another concavity 64 in FIG. 3C responding to a second gear. Sequentially actuators D and A may be driven into the carrier concavities to return to the first gear as shown in FIG. 3D and FIG. 3E. If a sequential third gear were to be selected instead, actuators C and A would be driven at the carrier 44 in sequence.

Figure 4:
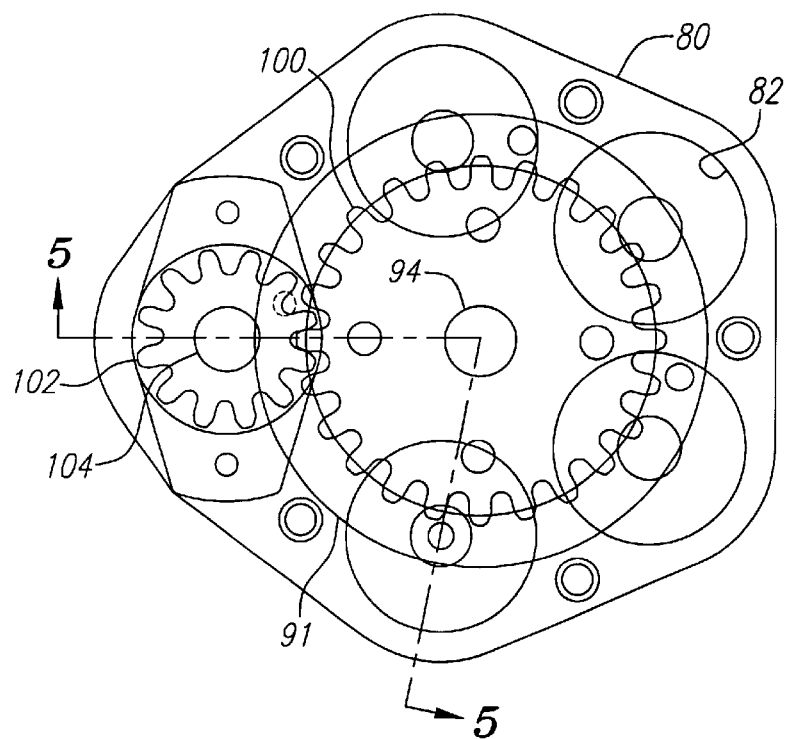
FIG. 4 is a layout plan view of a second indexer.
Figure 5:
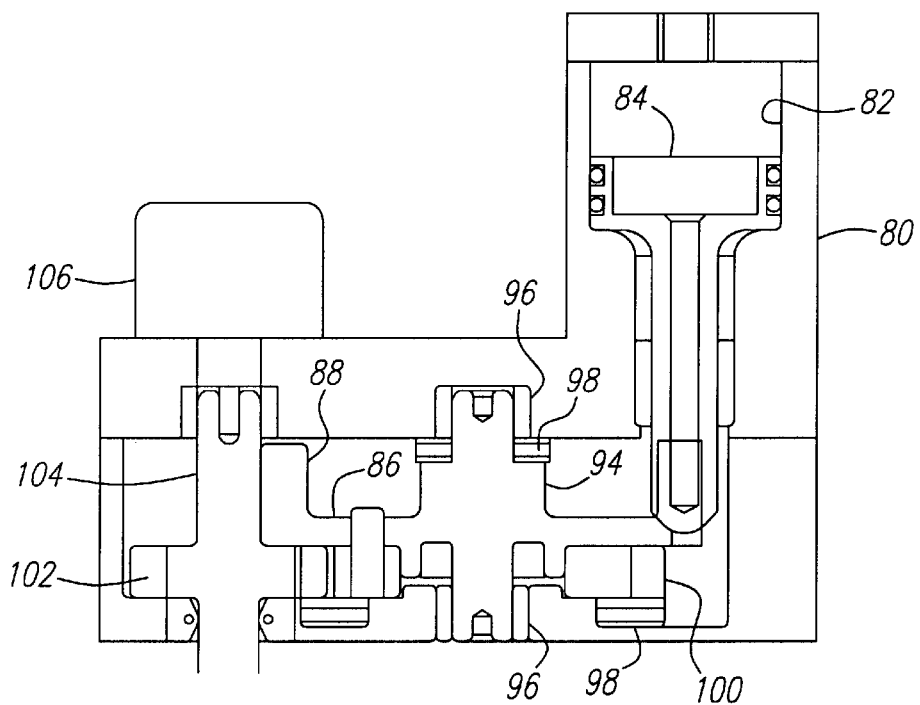
FIG. 5 is a cross-sectional elevation taken along line 5—5 of FIG. 4.
Figure 6A:
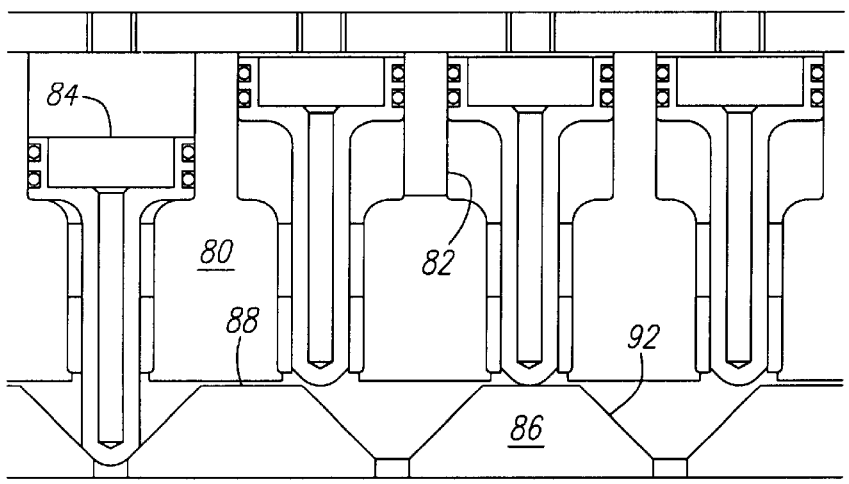
FIG. 6 illustrates functional plan views in series sequentially through one index advancement.
Figure 6B:
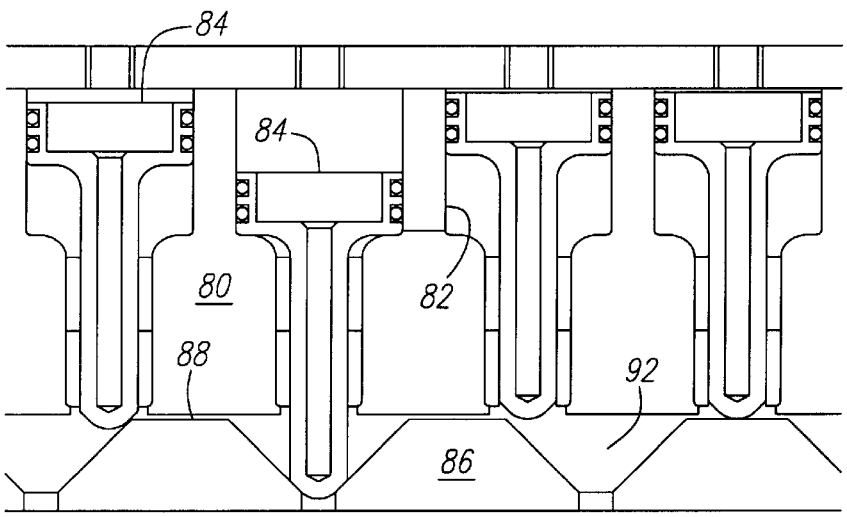
Figure 6C:
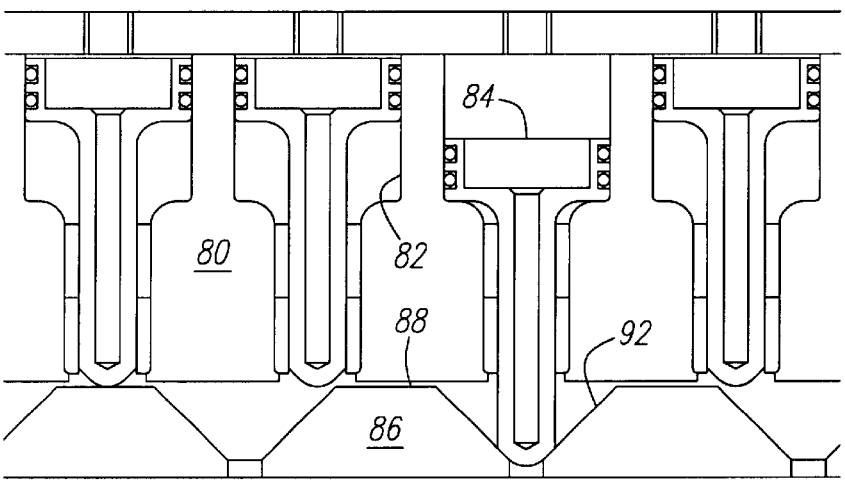

Turning to the embodiment of FIGS. 4, 5 and 6, a more compact indexing drive than illustrated in the first embodiment is disclosed. A housing 80 includes guideways 82 which are mutually parallel. The guideways 82 are similar in construction to those of the guideways 24 with like actuators 84 as well. A carrier 86 accommodates the reorientation of the actuators 84 by providing follower elements 88 which define a surface 91 circular in plan with equiangularly spaced concavities 92. Because of the geometry, the concavities 92 may be defined by straight sloped sides which are substantially 45° to the movement of the actuators 84. The concavities extend to a radiused V-bottom and are again symmetrical about centerplanes traversing each concavity. The angles of displacement of the actuators 84 and their operation relative to the concavities 92 of the carrier 86 are substantially the same as in the first embodiment.

The carrier 86 again includes a shaft 94 rotatably mounted in bearings 96 at either end and further including thrust bearings 98. A gear wheel 100 is fixed to rotate with the shaft 94. The gear wheel is engaged with an output gear wheel 102 which is also rotatably mounted such that the gear wheels 100 and 102 define an output drive gear for the indexer. The output gear wheel 102 is supported about a shaft 104 which is engaged with a rotary potentiometer 106. The output of the shaft 104 may include a pinion or provide direct drive to the mechanism being controlled.

Figure 7:
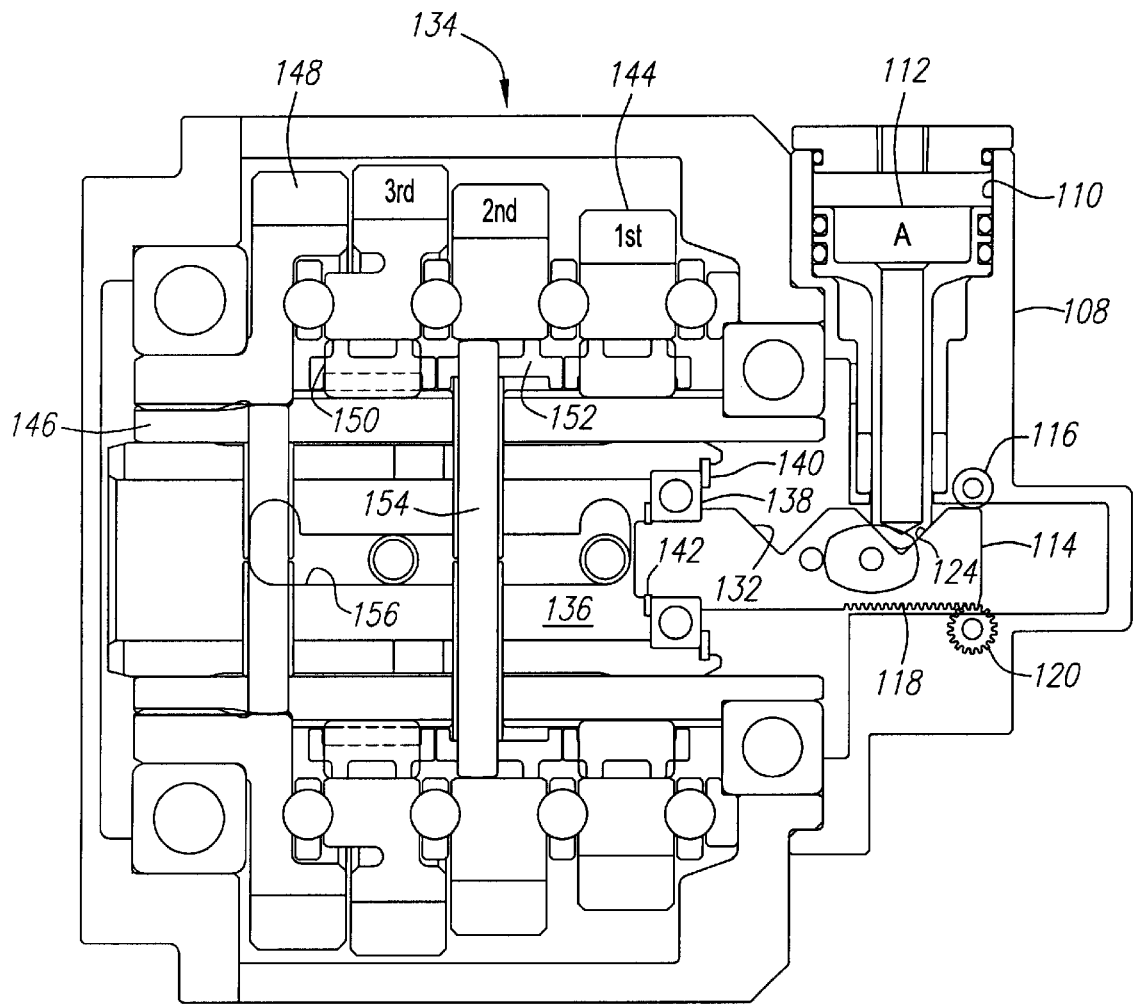
FIG. 7 is a schematic cross-sectional layout of a transmission as seen from direction 7 of FIG. 9.
Figure 8:
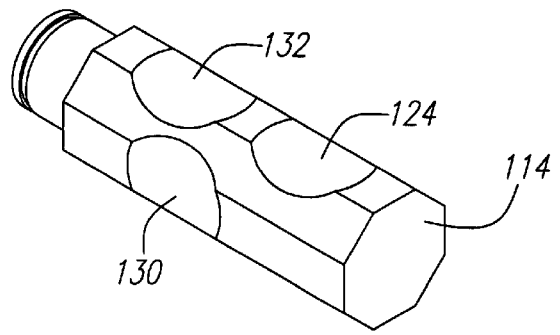
FIG. 8 is a perspective view of a carrier showing the visible sides illustrated in FIG. 7.
Figure 9:
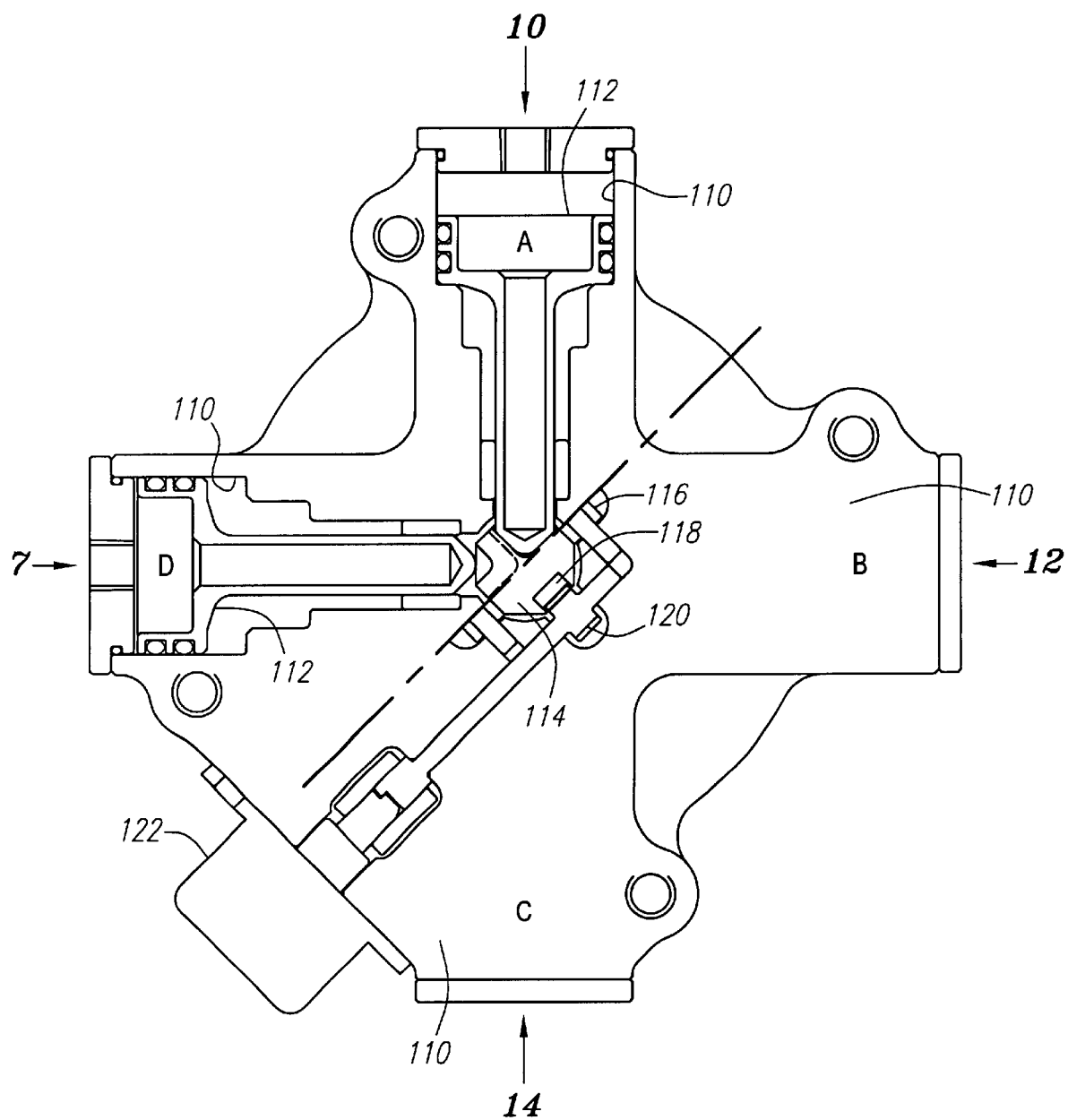
FIG. 9 is a schematic cross-sectional end view of the transmission of FIGS. 7, 10, 12, 14 and 16.
Figure 12:
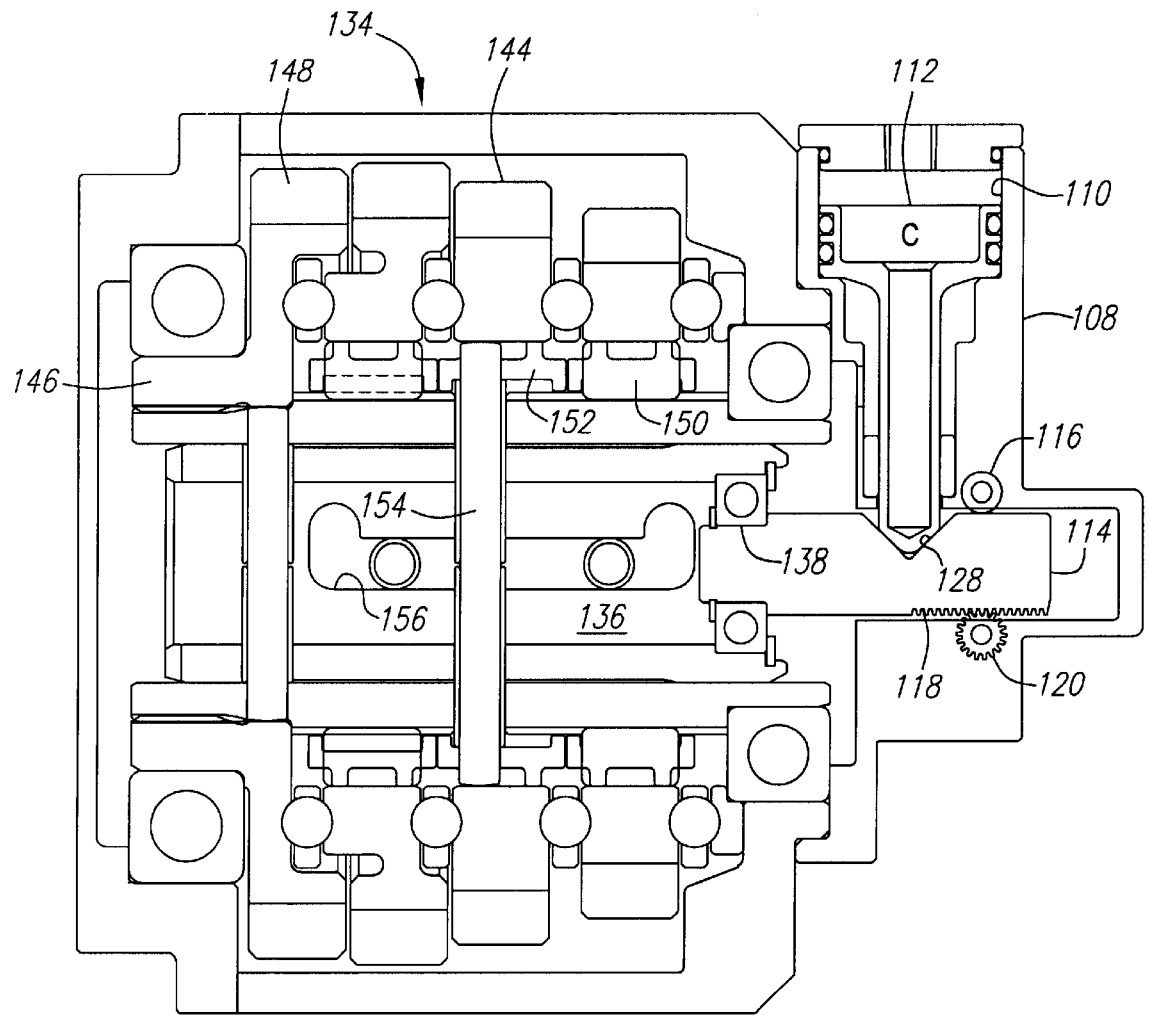
FIG. 12 is a schematic cross-sectional layout of the transmission of FIG. 7 as seen from direction 12 of FIG. 9 with the rotating elements viewed from the same angular orientation.
Figure 13:
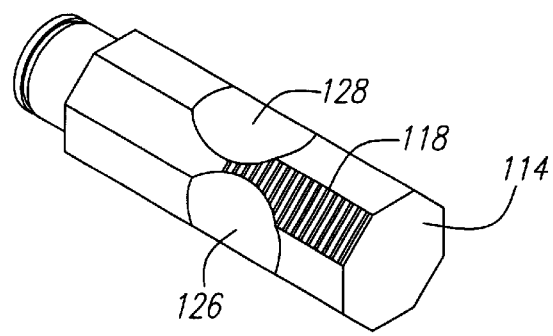
FIG. 13 is a perspective view of a carrier showing the visible sides illustrated in FIG. 12.
Figure 16:
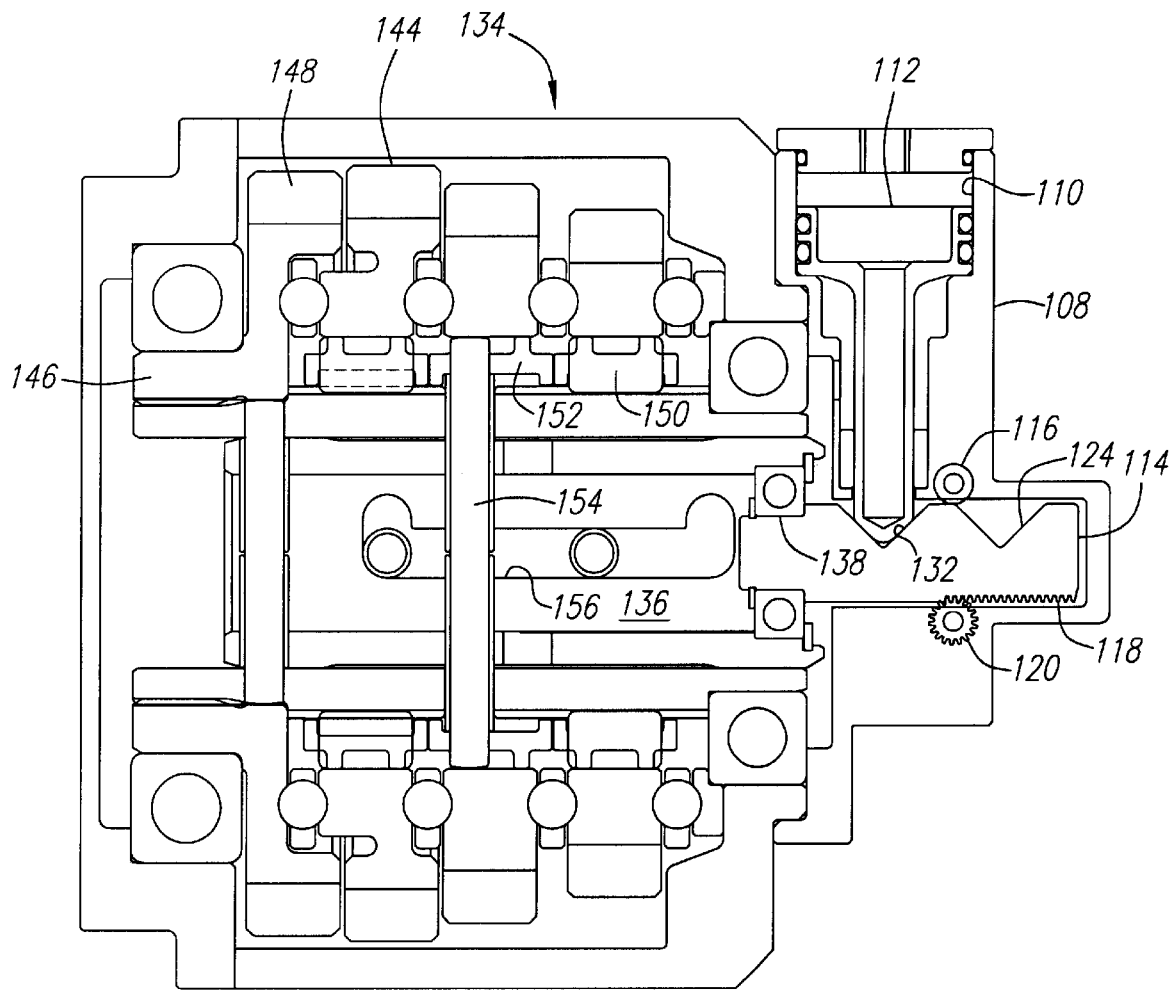
FIG. 16 is a schematic cross-sectional layout of the transmission of FIG. 7 as seen from direction 7 of FIG. 9 with the rotating elements viewed from the same angular orientation.
Figure 17:
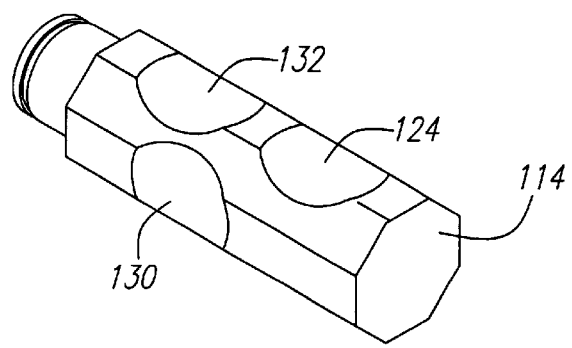
FIG. 17 is a perspective view of a carrier showing the visible sides illustrated in FIG. 16.

A further embodiment is illustrated in FIGS. 7 through 17. The schematic representation of these figures places the rotatable transmission assembly in the same angular orientation in each view. The indexer, however, is sequentially shown in FIGS. 7, 10, 12, 14 and 16 as rotated 90° in a counterclockwise direction as viewed from the right end of the figure. Thus, FIG. 7 and FIG. 16 show identical orientations of the indexing drive. The pinion and rack illustrated in each of these figures is actually only visible as depicted in FIG. 13 and would not be oriented as shown in any of FIGS. 7, 10, 12, 14 and 16. With that understanding, the indexing drive is shown to have a housing 108 which defines four guideways 110. The guideways 110 are equiangularly spaced at 90° so as to have longitudinal axes which intersect a locus of points defining a line normal to these longitudinal axes. Actuators 112 are associated with the guideways 110 as in prior embodiments. The actuators may include longitudinal axes which lie in a common plane. In this instance, the longitudinal axes converge to a single point of intersection.

Figure 10:
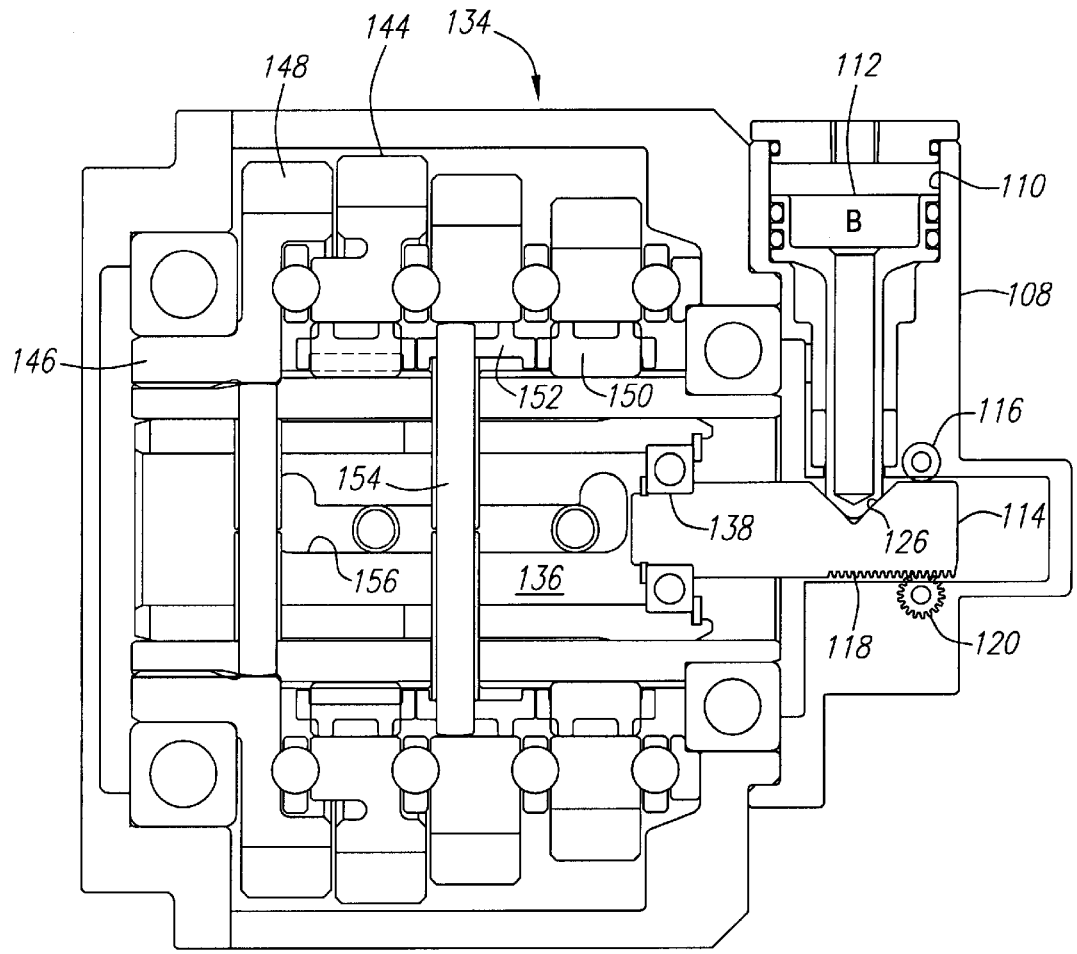
FIG. 10 is a schematic cross-sectional layout of the transmission of FIG. 7 as seen from direction 10 of FIG. 9 with the rotating elements viewed from the same angular orientation.
Figure 11:
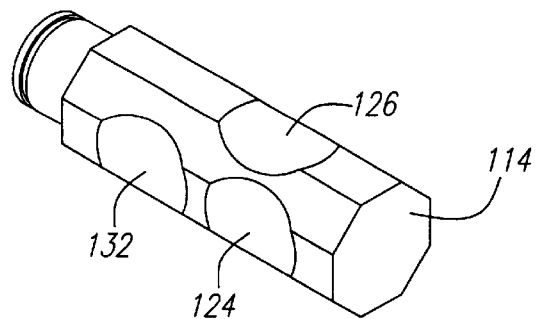
FIG. 11 is a perspective view of a carrier showing the visible sides illustrated in FIG. 10.

A carrier 114 is linearly movably mounted relative to the housing 108. The carrier is shown to be generally octagonal in cross section and guide wheels 116 keep it from rotational movement. Along one of the octagonal surfaces, a rack 118 is disposed to cooperate with a pinion 120 which drives a rotary potentiometer 122. The actuators 112 are not fully illustrated in FIG. 9. However, the profile of the housing 108 illustrates the locations of two of the actuators as well as the actuators shown. Further identifying the actuators 112 as A through D, FIG. 7 illustrates actuator A fully engaged with a first concavity 124 on the carrier 114. In FIG. 10, actuator B is shown engaged with concavity 126. This concavity 126 is progressively spaced along the carrier 114 from the first concavity 124 such that the actuator B was sufficiently aligned with the concavity 126 to be partially engageable when the actuator A was fully engaged with the concavity 124. With the actuator B fully engaged with the concavity 126, the actuator A is sufficiently aligned to be partially engageable with the concavity 124. At the same time, the actuator C is also sufficiently aligned to be partially engageable with a concavity 128 as well. A further concavity 130 similarly cooperates with the actuator D while a final concavity 132 cooperates with the actuator A. Additional concavities could progressively be presented about the carrier 114 if further indexing positions are required.

This final embodiment of the indexing drive is illustrated with a transmission, generally designated 134. The carrier 114 is shown in this embodiment to be directly coupled with a transmission actuator 136. In the prior two embodiments, a rack such as rack 58 may provide the appropriate coupling to the transmission actuator 136. The coupling between the carrier 114 and the transmission actuator 136 includes a bearing 138 and spring clips 140 and 142. Thus, the coupling between the carrier 114 and the transmission actuator 136 allows relative rotation but the two components are longitudinally fixed.

Figure 14:
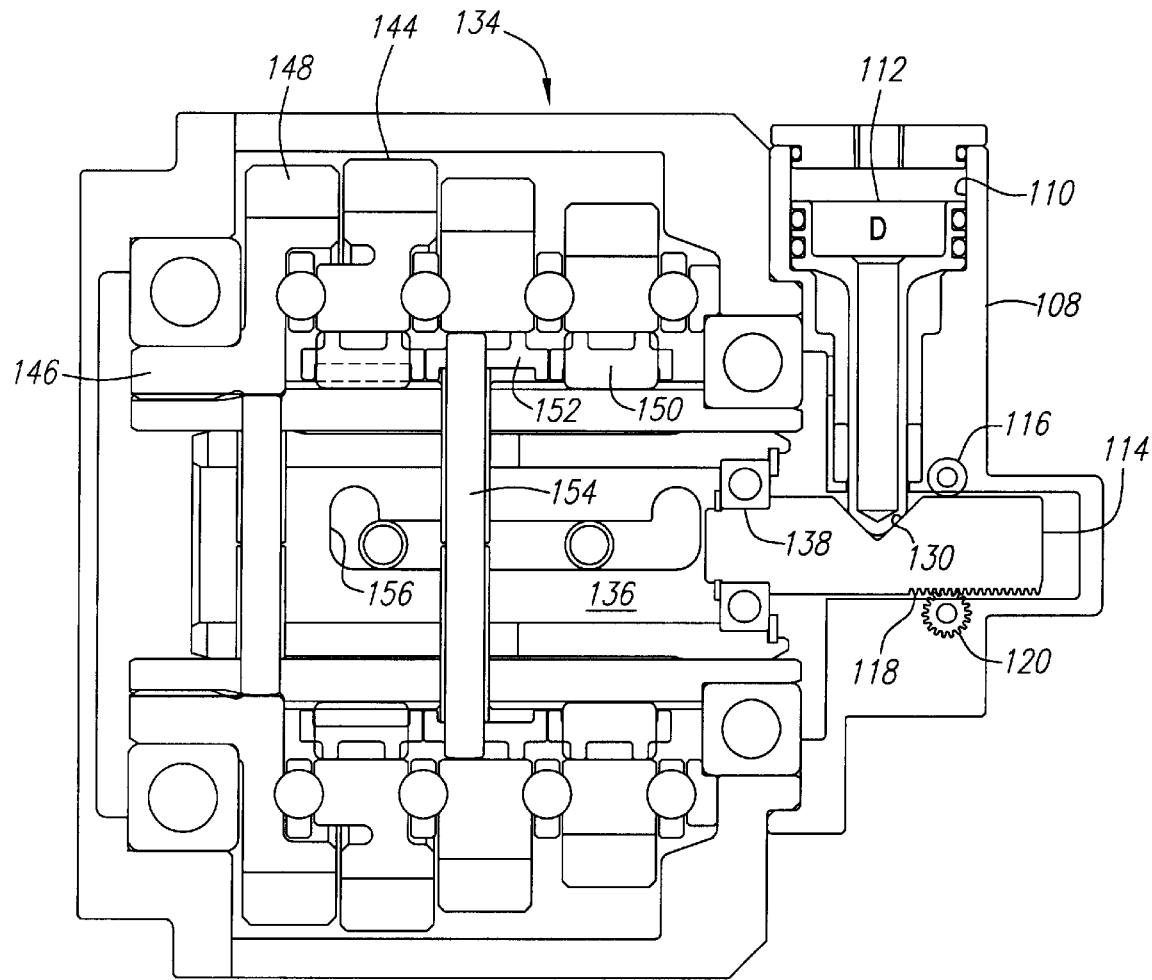
FIG. 14 is a schematic cross-sectional layout of the transmission of FIG. 7 as seen from direction 14 of FIG. 9 with the rotating elements viewed from the same angular orientation.
Figure 15:
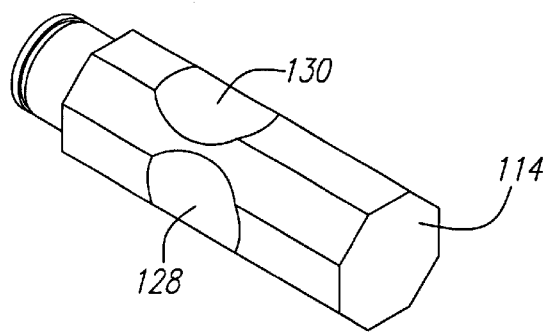
FIG. 15 is a perspective view of a carrier showing the visible sides illustrated in FIG. 14.

The transmission 134 is based on the design disclosed in U.S. Pat. No. 5,131,285 which is incorporated herein by reference for purposes of describing transmission operation. The transmission 134 includes three speeds forward with FIG. 7 illustrating the carrier position for first gear engagement. FIG. 10 illustrates a first neutral position. FIG. 12 illustrates a second gear engagement. FIG. 14 illustrates a second neutral position and FIG. 16 illustrates third gear engagement. The transmission gears 144 are engaged with a shaft 146 through roller clutches 150 controlled by roller cages 152. The shaft 146 is driven through the input 148. The roller cages 152 are positionally held by clutch control elements 154. Linkage in the form of the transmission actuator 136 controls the clutch control elements 154 in formed slots 156. The transmission actuator rotates with the shaft 146.

Figure 18:
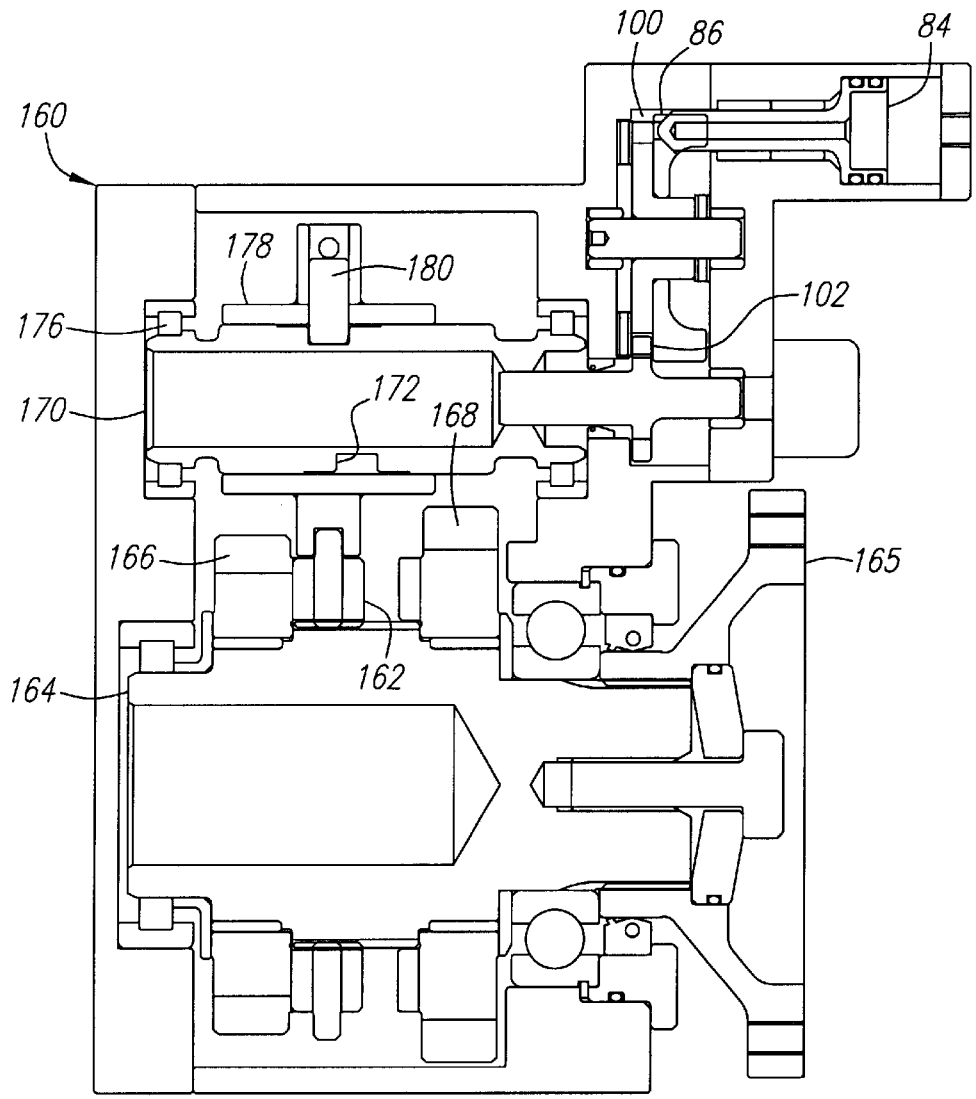
FIG. 18 is a schematic cross-sectional layout of a two speed transmission using a dog ring to control roller clutches with a barrel actuator driven by the indexing drive of FIGS. 4 and 5 shown in a first gear position.
Figure 19:
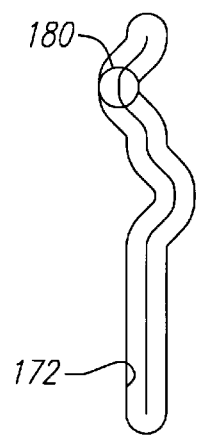
FIG. 19 is a layout view of the slot pattern on the barrel actuator with the shift pin in the first gear position.
Figure 20:
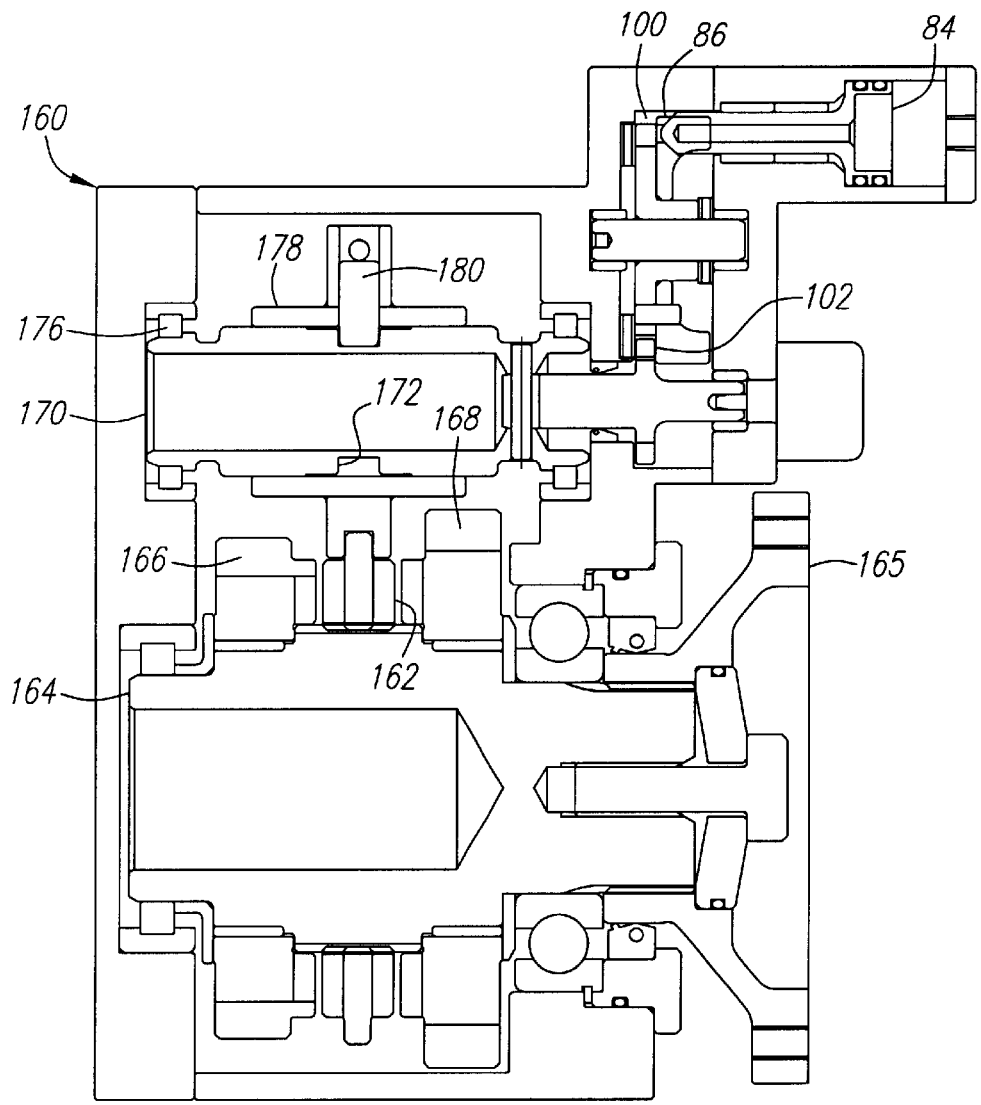
FIG. 20 is a schematic cross-sectional layout of a two speed transmission using a dog ring to control roller clutches with a barrel actuator driven by the indexing drive of FIGS. 4 and 5 shown in a neutral position.
Figure 21:
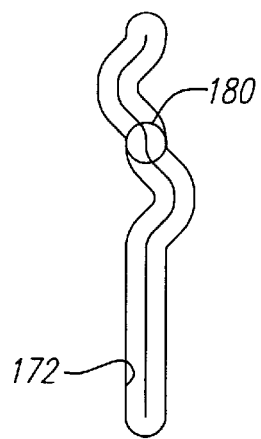
FIG. 21 is a layout view of the slot pattern on the barrel actuator with the shift pin in the neutral position.
Figure 22:
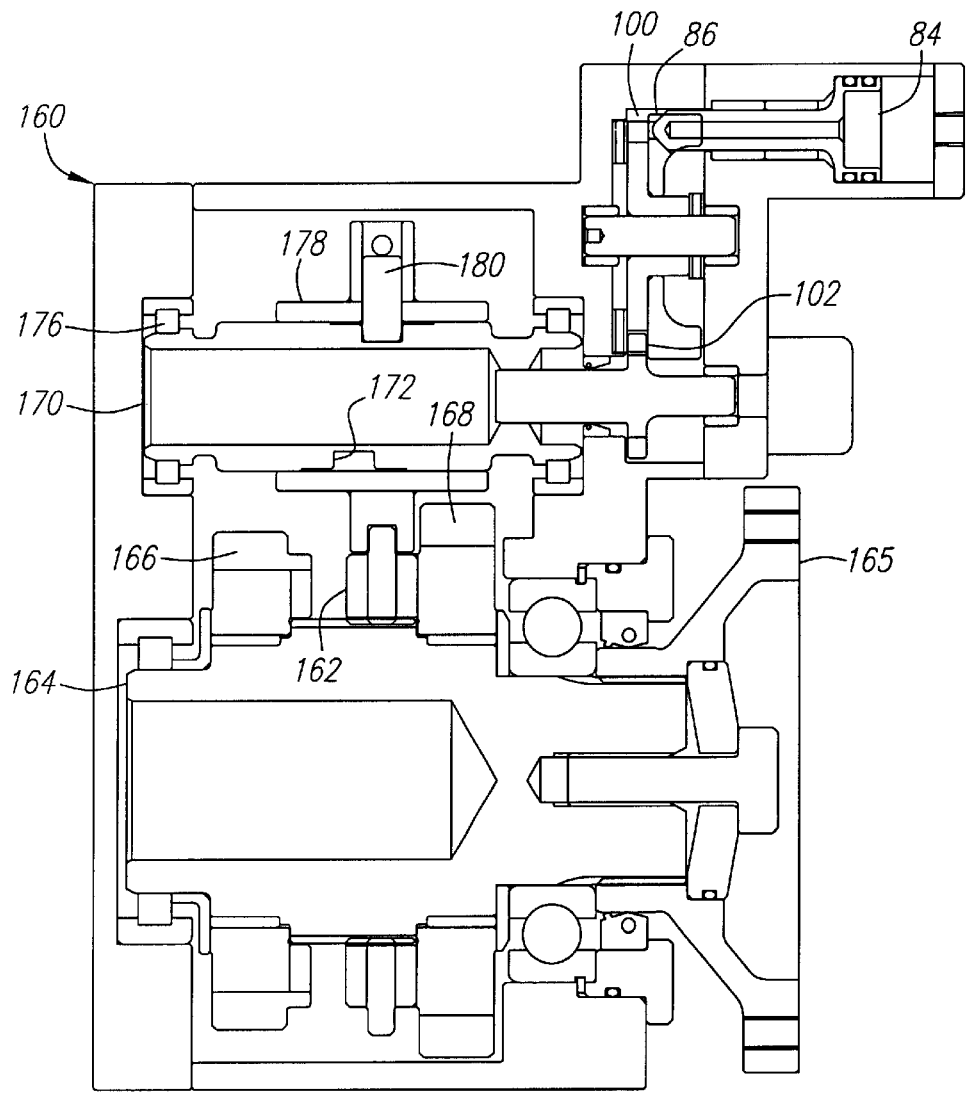
FIG. 22 is a schematic cross-sectional layout of a two speed transmission using a dog ring to control roller clutches with a barrel actuator driven by the indexing drive of FIGS. 4 and 5 shown in a second gear position.
Figure 23:
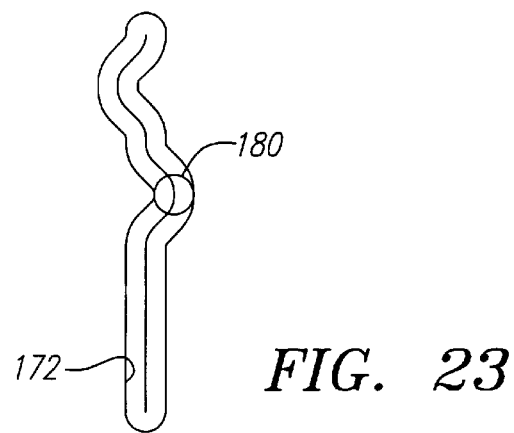
FIG. 23 is a layout view of the slot pattern on the barrel actuator with the shift pin in the second gear position.

A second transmission 160 illustrated in FIGS. 18 through 23 is based on a simpler design than disclosed in U.S. Pat. No. 5,131,285 in that it is a two speed transmission using a dog ring 162 as the clutch control element to control roller clutches between an output shaft 164 having a output flange 165 and the first and second gears 166 and 168, respectively. Linkage in the form of a barrel assembly is rotatably driven by the indexing drive of FIGS. 4 and 5. The barrel assembly includes a transmission actuator barrel 170 having a slot 172 about the circumference thereof. An indexing drive output gear wheel 102 engaged with the carrier gear 100 of the indexing drive is rotationally fixed with the barrel 170 by splines to index the barrel 170. The barrel 170 is rotatably mounted in bearings 176. The linkage further includes a shifting fork 178 engaging the dog ring 162 and having a shift pin 180 to engage the slot 172. The three positions of the dog ring 162 to achieve first gear, neutral and second gear are illustrated in FIGS. 18, 20 and 22, respectively. Corresponding FIGS. 19, 21 and 23 illustrate the position of the shift pin 180 with each of these gear positions. In the slot 172, positions "N" represent neutral while "1" is the first gear position and "2" is the second gear position. Each position in this two speed system represents activation of one of the actuators 84 to engage a concavity 92 with the first and last neutral positions corresponding to actuation of the same actuator 84 with the carrier 86 having gone full circle.

Accordingly, an improved indexing drive has been disclosed in three embodiments. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An indexing drive comprising
   a housing including a plurality of guideways;
   no more than four actuators slidably mounted in the guideways, respectively, the actuators each including a drive element extending beyond the associated guideway;
   a carrier including no more than four follower elements, the drive elements extendable to the follower elements, the follower elements being movable across the drive elements, the drive elements being movable toward and away from the follower elements, one of each drive element and each follower element including a concavity and the other of each drive element and each follower element including a convexity, the concavities being spaced from one another and the convexities being spaced from one another such that when one of the concavities is fully engaged with one of the convexities, another of the concavities and another of the convexities are sufficiently aligned to be partially engageable.

2. The indexing drive of claim 1, the concavities being spaced from one another and the convexities being spaced from one another such that when one of the concavities is fully engaged with one of the convexities, two other of the concavities and two other of the convexities are sufficiently aligned to be partially engageable, respectively, full engagement of one of the two other concavities and one of the two other convexities requiring movement of the carrier in a first direction and full engagement of the other of the two other concavities and the other of the two other convexities requiring movement of the carrier in a second direction.

3. The indexing drive of claim 2, the carrier being linearly movably mounted.

4. The indexing drive of claim 3, the guideways each including a longitudinal axis, the longitudinal axes all intersecting a locus of points defining a line normal to the axes.

5. The indexing drive of claim 1, the drive elements having the convexities and the follower elements having the concavities.

6. The indexing drive of claim 1, the carrier being rotatably mounted.

7. The indexing drive of claim 6, there being four concavities and four convexities.

8. The indexing drive of claim 6, the guideways being mutually parallel.

9. The indexing drive of claim 6, the guideways each including a longitudinal axis, the longitudinal axes all intersecting a locus of points in a line normal to the axes.

10. The indexing drive of claim 9, the locus of points defining a point.

11. The indexing drive of claim 1 further comprising
    a selectively activated source of pressurized fluid, the guideways each being coupled with the selectively activated source of pressurized fluid.

12. The indexing drive of claim 11, the selectively activated source of pressurized fluid including a source of pneumatic pressure, passages extending from the source of pneumatic pressure to the guideways, respectively, and valves controlling the passages.

13. The indexing drive of claim 1, the concavities including sloped sides extending to a V-bottom with each concavity being symmetrical about a centerplane.

14. The indexing drive of claim 13, the sloped sides each being at substantially 45° to the movement of one of the drive elements with contact between the sloped side and that drive element.

15. An indexing drive comprising a housing including a plurality of guideways;

actuators slidably mounted in the guideways, respectively, the actuators each including a drive element extending beyond the associated guideway;

a carrier including follower elements, the drive elements extendable to the follower elements, the follower elements being movable across the drive elements, the drive elements being movable toward and away from the follower elements, one of each drive element and each follower element including a concavity and the other of each drive element and each follower element including a convexity, the concavities being spaced from one another and the convexities being spaced from one another such that when one of the concavities is fully engaged with one of the convexities, another of the concavities and another of the convexities are sufficiently aligned to be partially engageable;

a selectively activated source of pressurized fluid, the guideways each being coupled with the selectively activated source of pressurized fluid, the selectively activated source of pressurized fluid including a source of pneumatic pressure, passages extending from the source of pneumatic pressure to the guideways, respectively, and valves controlling the passages; and a controller, the selectively activated source of pneumatic pressure further including solenoids connected to the controller and controlling the valves, respectively.

16. An indexing drive comprising a housing including a plurality of guideways;

actuators slidably mounted in the guideways, respectively, the actuators each including a drive element extending beyond the associated guideway;

a carrier including follower elements, the drive elements extendable to the follower elements, the follower elements being movable across the drive elements, the drive elements being movable toward and away from the follower elements, one of each drive element and each follower element including a concavity and the other of each drive element and each follower element including a convexity, the concavities being spaced from one another and the convexities being spaced from one another such that when one of the concavities is fully engaged with one of the convexities, another of the concavities and another of the convexities are sufficiently aligned to be partially engageable;

a controller; and electromagnetic coils connected to the controller and magnetically coupleable with the actuators, respectively.

17. An indexing drive comprising a housing including a plurality of guideways;

no more than four actuators slidably mounted in the guideways, respectively, the actuators each including a drive element extendable beyond the associated guideway and having a convexity;

a carrier including no more than four follower elements each having a concavity, the drive elements extendable to the follower elements, the follower elements being movable across the drive elements, the drive elements being movable toward and away from the follower elements, the concavities being spaced from one another and the convexities being spaced from one another such that when one of the concavities is fully engaged with one of the convexities, two other of the concavities and two other of the convexities are sufficiently aligned to be partially engageable, respectively, full engagement of one of the two other concavities and one of the two other convexities requiring movement of the carrier in a first direction and full engagement of the other of the two other concavities and the other of the two other convexities requiring movement of the carrier in a second direction.

18. The indexing drive of claim 17 further comprising a source of pneumatic pressure in selective communication with the guideways;

valves pneumatically between the source of pneumatic pressure and the guideways to control communication of pneumatic pressure to the guideways, respectively.

19. The indexing drive of claim 17, the concavities including sloped sides extending to a V-bottom with each concavity being symmetrical about a centerplane, the sloped sides each being at substantially 45° to the movement of one of the drive elements with contact between the sloped side and that drive element.

20. An indexing drive comprising a housing including a plurality of guideways;

actuators slidably mounted in the guideways, respectively, the actuators each including a drive element extendable beyond the associated guideway and having a convexity, the drive elements being mutually parallel;

a carrier including follower elements each having a concavity, the follower elements defining a surface circular in plan with the concavities therein, the carrier being rotatably mounted, the drive elements being extendable to the follower elements, the follower elements being movable across the drive elements, the concavities being spaced from one another and the convexities being spaced from one another such that when one of the concavities is fully engaged with one of the convexities, two other of the concavities and two other of the convexities are sufficiently aligned to be partially engageable, respectively, engagement of one of the two other concavities and one of the two other convexities requiring movement of the carrier in a first direction and engagement of the other of the two other concavities and the other of the two other convexities requiring movement of the carrier in a second direction.

21. The indexing drive of claim 20 further comprising a gear coupled with the carrier.

22. The indexing drive of claim 20 further comprising a source of pressurized fluid, the guideways each being selectively coupled with the source of pressurized fluid.

23. The indexing drive of claim 22, the source of pressurized fluid including a source of pneumatic pressure, passages extending from the source of pneumatic pressure to the guideways, respectively, and valves controlling the passages.

24. The indexing drive of claim 23 further comprising a controller, the source of pneumatic pressure further including solenoids connected to the controller and controlling the valves, respectively.

25. The indexing drive of claim 20 further comprising a controller;

electromagnetic coils connected to the controller and magnetically coupleable with the actuators, respectively.

26. The indexing drive of claim 20, the concavities including sloped sides extending to a V-bottom with each concavity being symmetrical about a centerplane, the sloped sides each being at substantially 45° to the movement of one of the drive elements with contact between the sloped side and that drive element.

27. An indexing drive comprising a housing including a plurality of guideways;

no more than four actuators slidably mounted in the guideways, respectively, the actuators each including a drive element extending beyond the associated guideway and having a convexity;

a carrier including no more than four follower elements each having a concavity, the follower elements defining a cylindrical surface with the concavities therein, the carrier being rotatably mounted about a carrier axis, the guideways including longitudinal centerlines intersecting with the carrier axis, the drive elements being extendable to the follower elements, the follower elements being movable across the drive elements, the concavities being spaced from one another and the convexities being spaced from one another such that when one of the concavities is fully engaged with one of the convexities, two other of the concavities and two other of the convexities are sufficiently aligned to be engageable, respectively, engagement of one of the two other concavities and one of the two other convexities requiring movement of the carrier in a first direction and engagement of the other of the two other concavities and the other of the two other convexities requiring movement of the carrier in a second direction.

28. The indexing drive of claim 27 further comprising a source of pressurized fluid, the guideways each being selectively coupled with the source of pressurized fluid.

29. The indexing drive of claim 28, the source of pressurized fluid including a source of pneumatic pressure, passages extending from the source of pneumatic pressure to the guideways, respectively, and valves controlling the passages.

30. The indexing drive of claim 29, further comprising a controller, the source of pneumatic pressure further including solenoids connected to the controller and controlling the valves, respectively.

31. The indexing drive of claim 27 further comprising a controller;

electromagnetic coils connected to the controller and magnetically coupleable with the actuators, respectively.

32. The indexing drive of claim 27, the concavities including sloped sides extending to a V-bottom with each concavity being symmetrical about a centerplane, the sloped sides each being at substantially 45° to the movement of one of the drive elements with contact between the sloped side and that drive element.

33. An indexing drive comprising a housing including a plurality of guideways;

actuators slidably mounted in the guideways, respectively, the actuators each including a drive element extending beyond the associated guideway and having a convexity;

a carrier including follower elements each having a concavity, the follower elements defining a cylindrical surface with the concavities therein, the carrier being rotatably mounted about a carrier axis, the guideways including longitudinal centerlines intersecting with the carrier axis, the drive elements being extendable to the follower elements, the follower elements being movable across the drive elements, the concavities being spaced from one another and the convexities being spaced from one another such that when one of the concavities is fully engaged with one of the convexities, two other of the concavities and two other of the convexities are sufficiently aligned to be engageable, respectively, engagement of one of the two other concavities and one of the two other convexities requiring movement of the carrier in a first direction and engagement of the other of the two other concavities and the other of the two other convexities requiring movement of the carrier in a second direction; and a gear coupled with the carrier.

34. An indexing drive comprising a housing including a plurality of guideways;

actuators slidably mounted in the guideways, respectively, the actuators each including a drive element extending beyond the associated guideway and having a convexity;

a carrier including follower elements each having a concavity, the carrier being linearly movably mounted along a carrier axis, the guideways including longitudinal centerlines intersecting with the carrier axis, the drive elements being extendable to the follower elements, the follower elements being movable across the drive elements, the concavities being spaced from one another and the convexities being spaced from one another such that when one of the concavities is fully engaged with one of the convexities, two other of the concavities and two other of the convexities are sufficiently aligned to be engageable, respectively, engagement of one of the two other concavities and one of the two other convexities requiring movement of the carrier in a first direction and engagement of the other of the two other concavities and the other of the two other convexities requiring movement of the carrier in a second direction.

35. The indexing drive of claim 34, the carrier having longitudinal surfaces extending in the direction of the carrier axis, the follower elements being the concavities and being located in the longitudinal surfaces.

36. The indexing drive of claim 34 further comprising a source of pressurized fluid, the guideways each being selectively coupled with the source of pressurized fluid.

37. The indexing drive of claim 36, the source of pressurized fluid including a source of pneumatic pressure, passages extending from the source of pneumatic pressure to the guideways, respectively, and valves controlling the passages.

38. The indexing drive of claim 37 further comprising a controller, the source of pneumatic pressure further including solenoids connected to the controller and controlling the valves, respectively.

39. The indexing drive of claim 34 further comprising a controller;

electromagnetic coils connected to the controller and magnetically coupleable with the actuators, respectively.

40. The indexing drive of claim 34, the concavities including sloped sides extending to a V-bottom with each concavity being symmetrical about a centerplane, the sloped sides each being at substantially 45° to the movement of one of the drive elements with contact between the sloped side and that drive element.

41. A transmission comprising an indexing drive including a housing including a plurality of guideways, actuators slidably mounted in the guideways, respectively, the actuators each including a drive element extending beyond the associated guideway, a carrier including follower elements, the drive elements extendable to the follower elements, the follower elements being movable across the drive elements, the drive elements being movable toward and away from the follower elements, one of each drive element and each follower element including a concavity and the other of each drive element and each follower element including a convexity, the concavities being spaced from one another and the convexities being spaced from one another such that when one of the concavities is fully engaged with one of the convexities, another of the concavities and another of the convexities are sufficiently aligned to be partially engageable;

transmission gears;

clutches engageable with the transmission gears, respectively;

clutch control elements extending to operatively engage the clutches;

linkage engaged with the carrier and the clutch control elements.

42. The transmission of claim 41, the carrier being rotatable, the linkage including a gear fixed to rotate with the carrier, a rack engaged with the gear and a transmission actuator rotatable relative to the rack and longitudinally fixed to the rack.

43. The transmission of claim 41, the carrier being linerally movable, the linkage including a transmission actuator rotatable relative to the carrier and longitudinally fixed to the carrier.

44. The transmission of claim 41, the carrier being rotationally movable, the linkage including a transmission actuator rotatably engaged relative to the carrier.

45. The transmission of claim 41, the concavities being spaced from one another and the convexities being spaced from one another such that when one of the concavities is fully engaged with one of the convexities, two other of the concavities and two other of the convexities are sufficiently aligned to be partially engageable, respectively, full engagement of one of the two other concavities and one of the two other convexities requiring movement of the carrier in a first direction and full engagement of the other of the two other concavities and the other of the two other convexities requiring movement of the carrier in a second direction.

46. The transmission of claim 45, the carrier being linearly movably mounted.

47. The transmission of claim 46, the guideways each including a longitudinal axis, the longitudinal axes all intersecting a locus of points defining a line normal to the axes.

48. The transmission of claim 41, the drive elements having the convexities and the follower elements having the concavities.

49. The transmission of claim 41, the carrier being rotatably mounted.

50. The transmission of claim 49, there being no more than four concavities and no more than four convexities.

51. The transmission of claim 49, the guideways being mutually parallel.

52. The transmission of claim 49, the guideways each including a longitudinal axis, the longitudinal axes all intersecting a locus of points in a line normal to the axes.

53. The transmission of claim 52, the locus of points defining a point.

54. The transmission of claim 41 further comprising a selectively activated source of pressurized fluid, the guideways each being coupled with the selectively activated source of pressurized fluid.

55. The transmission of claim 54, the selectively activated source of pressurized fluid including a source of pneumatic pressure, passages extending from the source of pneumatic pressure to the guideways, respectively, and valves controlling the passages.

56. The transmission of claim 55 further comprising a controller, the selectively activated source of pneumatic pressure further including solenoids connected to the controller and controlling the valves, respectively.

57. The transmission of claim 41 further comprising a controller;

electromagnetic coils connected to the controller and magnetically coupleable with the actuators, respectively.

58. The transmission of claim 41, the concavities including sloped sides extending to a V-bottom with each concavity being symmetrical about a centerplane.

59. The transmission of claim 58, the sloped sides each being at substantially 45° to the movement of one of the drive elements with contact between the sloped side and that drive element.

60. An indexing drive comprising a housing including a plurality of guideways;

actuators slidably mounted in the guideways, respectively, the actuators each including a drive element extending beyond the associated guideway;

a carrier including follower elements, the drive elements extendable to the follower elements, the follower elements being movable across the drive elements, the drive elements being movable toward and away from the follower elements, one of each drive element and each follower element including a concavity and the other of each drive element and each follower element including a convexity, the concavities being spaced from one another and the convexities being spaced from one another such that when one of the concavities is fully engaged with one of the convexities, another of the concavities and another of the convexities are sufficiently aligned to be partially engageable; and a gear coupled with the carrier.

61. An indexing drive comprising a housing including a plurality of guideways;

actuators slidably mounted in the guideways, respectively, the actuators each including a drive element extendable beyond the associated guideway and having a convexity;

a carrier including follower elements each having a concavity, the drive elements extendable to the follower elements, the follower elements being movable across the drive elements, the drive elements being movable toward and away from the follower elements, the concavities being spaced from one another and the convexities being spaced from one another such that when one of the concavities is fully engaged with one of the convexities, two other of the concavities and two other of the convexities are sufficiently aligned to be partially engageable, respectively, full engagement of one of the two other concavities and one of the two other convexities requiring movement of the carrier in a first direction and full engagement of the other of the two other concavities and the other of the two other convexities requiring movement of the carrier in a second direction; and a gear coupled with the carrier.

* * * * *